United States Patent
Mosley

(10) Patent No.: US 9,915,467 B1
(45) Date of Patent: Mar. 13, 2018

(54) REFRIGERATOR WITH INTEGRATED MULTI-SPEED BLENDER

(71) Applicant: Sheila Mosley, Chickasha, OK (US)

(72) Inventor: Sheila Mosley, Chickasha, OK (US)

( * ) Notice: Subject to any disclaimer, the term of this patent is extended or adjusted under 35 U.S.C. 154(b) by 0 days.

(21) Appl. No.: 15/342,071

(22) Filed: Nov. 2, 2016

(51) Int. Cl.
  *F25D 23/12* (2006.01)
  *F25D 23/02* (2006.01)
  *F25D 11/02* (2006.01)
  *B67D 1/00* (2006.01)
  *B67D 1/08* (2006.01)
  *B67D 1/16* (2006.01)
  *A47J 43/044* (2006.01)

(52) U.S. Cl.
  CPC ............ *F25D 23/12* (2013.01); *A47J 43/044* (2013.01); *B67D 1/0003* (2013.01); *B67D 1/0053* (2013.01); *B67D 1/0894* (2013.01); *B67D 1/16* (2013.01); *F25D 11/02* (2013.01); *F25D 23/028* (2013.01); *F25D 23/126* (2013.01)

(58) Field of Classification Search
  CPC ...................................... A47G 19/24
  USPC ....... 221/173, 1, 146.6; 62/389, 337; 99/284
  See application file for complete search history.

(56) References Cited

U.S. PATENT DOCUMENTS

| | | | |
|---|---|---|---|
| 3,333,830 A | 8/1967 | Spingler et al. | |
| 3,722,835 A | 3/1973 | Knott | |
| 5,489,807 A | 2/1996 | Sanjuan et al. | |
| 6,523,990 B1 | 2/2003 | Lee | |
| 7,032,780 B2 | 4/2006 | Crisp, III | |
| 7,665,398 B2 | 2/2010 | Gerber | |
| 8,359,969 B2* | 1/2013 | Van Dillen | A47J 31/407 99/284 |
| 8,650,902 B2* | 2/2014 | Shin | F25D 23/12 222/146.1 |
| 9,556,011 B2* | 1/2017 | Van Dillen | A47J 31/0668 |
| 2004/0233781 A1* | 11/2004 | Dickson, Jr. | A23G 9/045 366/318 |
| 2007/0209522 A1* | 9/2007 | Bigge | A47J 31/36 99/279 |
| 2010/0058931 A1* | 3/2010 | Righetti | A47J 31/401 99/286 |
| 2011/0129581 A1* | 6/2011 | Overton | A23L 2/38 426/431 |
| 2011/0146330 A1* | 6/2011 | Kuehl | F16L 37/26 62/389 |

(Continued)

*Primary Examiner* — Lori Baker
(74) *Attorney, Agent, or Firm* — Stevenson IP, LLC

(57) ABSTRACT

A refrigerator with an integrated multi-speed blender including a stand alone kitchen refrigerator having a recess in a front door thereof and a continuous opening therein. A housing body, on the upper side of the recess, stores components of a motorized blender assembly adjacent to a water dispenser within the recess. The blender assembly includes a mixer shaft operationally communicating with the motor and extending into the recess opening, with blades on a distal end thereof, first and second control switches proximal and operationally controlling the motor, first and second pressure control buttons on a forward side of the housing body, which when pushed along with an activation switch, activate the motor and operate the motor at a first speed and at a faster second speed, respectively. An activation button movable between an initial lower position to a second upper position activates the activation switch in the second upper position.

4 Claims, 4 Drawing Sheets

(56) References Cited

U.S. PATENT DOCUMENTS

| 2012/0104022 A1* | 5/2012 | Boarman | F25D 23/126 |
| | | | 99/275 |
| 2015/0228140 A1* | 8/2015 | Martin | G07D 3/16 |
| | | | 453/3 |

* cited by examiner

REFRIGERATOR WITH INTEGRATED MULTI-SPEED BLENDER

BACKGROUND OF THE INVENTION

Various types of motorized kitchen appliances for processing, mixing, and freezing foods and drinks are known in the prior art. However, what is needed is a refrigerator with an integrated multi-speed blender for the convenient preparation of blended foods and drinks, such as health drinks, milkshakes, and frozen non-alcoholic and alcoholic drinks, in which the blender is disposed in the refrigerator door proximal the conventional chilled water and ice dispenser. The location of the blender on the refrigerator eliminates the need for a stand alone blender and frees the space and reduces clutter on the kitchen countertop which would otherwise be occupied by the blender.

FIELD OF THE INVENTION

The present invention relates to kitchen appliances, and more particularly, to a refrigerator with an integrated multi-speed blender.

SUMMARY OF THE INVENTION

The general purpose of the present refrigerator with an integrated multi-speed blender, described subsequently in greater detail, is to provide a refrigerator with an integrated multi-speed blender which has many novel features that result in a refrigerator with an integrated multi-speed blender which is not anticipated, rendered obvious, suggested, or even implied by prior art, either alone or in combination thereof.

To accomplish this, the present refrigerator with an integrated multi-speed blender includes a stand alone kitchen refrigerator having a front door, a fresh food compartment accessed by the front door, and a freezer compartment, having an access door, separate from the fresh food compartment. A recess, disposed in the front door, includes a plurality of apertures is disposed in a lower side thereof for drainage of liquid into a liquid collection pan disposed directly underneath the lower side. The recess includes an opening disposed between upper and lower sides thereof, right and left sides thereof, a back side and a front frame thereof. A housing body, continuously disposed on the upper side of the recess from the right side to the left side, is provided to store various components of a blender assembly. A water dispenser is mounted on the back side of the recess and includes a user interface with at least one control button, provided to enable a user to select a preferred dispensing operation, and a fluid supply line extending from the water dispenser to a source of water.

The blender assembly is disposed within the recess adjacent the water dispenser and includes a motor disposed atop the support bracket. A mixer shaft is in operational communication with the motor and extends through the support bracket into the recess opening. A plurality of spaced apart blades is disposed on a distal end of the mixer shaft. The opening of the recess has a depth, a width, and a length configured to receive a liquid container therein when a portion of the mixer shaft and the plurality of blades are disposed within the liquid container. The blender assembly also includes first and second control switches on a top surface of the support bracket proximal to and in operational control with the motor. First and second pressure control buttons, disposed on a forward side of the housing body, are in direct operational communication with the first and second control switches, respectively. An activation switch, disposed on the support bracket, is also in direct operational communication with the motor. The activation switch activates and alternately deactivates the motor. An activation button, disposed on the bottom surface of the support bracket and extending into the recess opening, is in direct operational communication with the activation switch and is movable between an initial lower position to a second upper position.

Upon movement of the activation button from the initial lower position to the second upper position, the activation switch is transformed from a deactivated condition to an activated condition. Upon transformation of the activation switch to the activated condition, the activation switch activates the motor. Upon activation of the activation switch activation of the first pressure control button, and the activation of the first control switch, the motor operates at a first speed. Upon activation of the activation switch and activation of the second pressure control button, the motor operates at a second speed. The second speed is faster than the first speed.

Thus has been broadly outlined the more important features of the present refrigerator with an integrated multi-speed blender so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
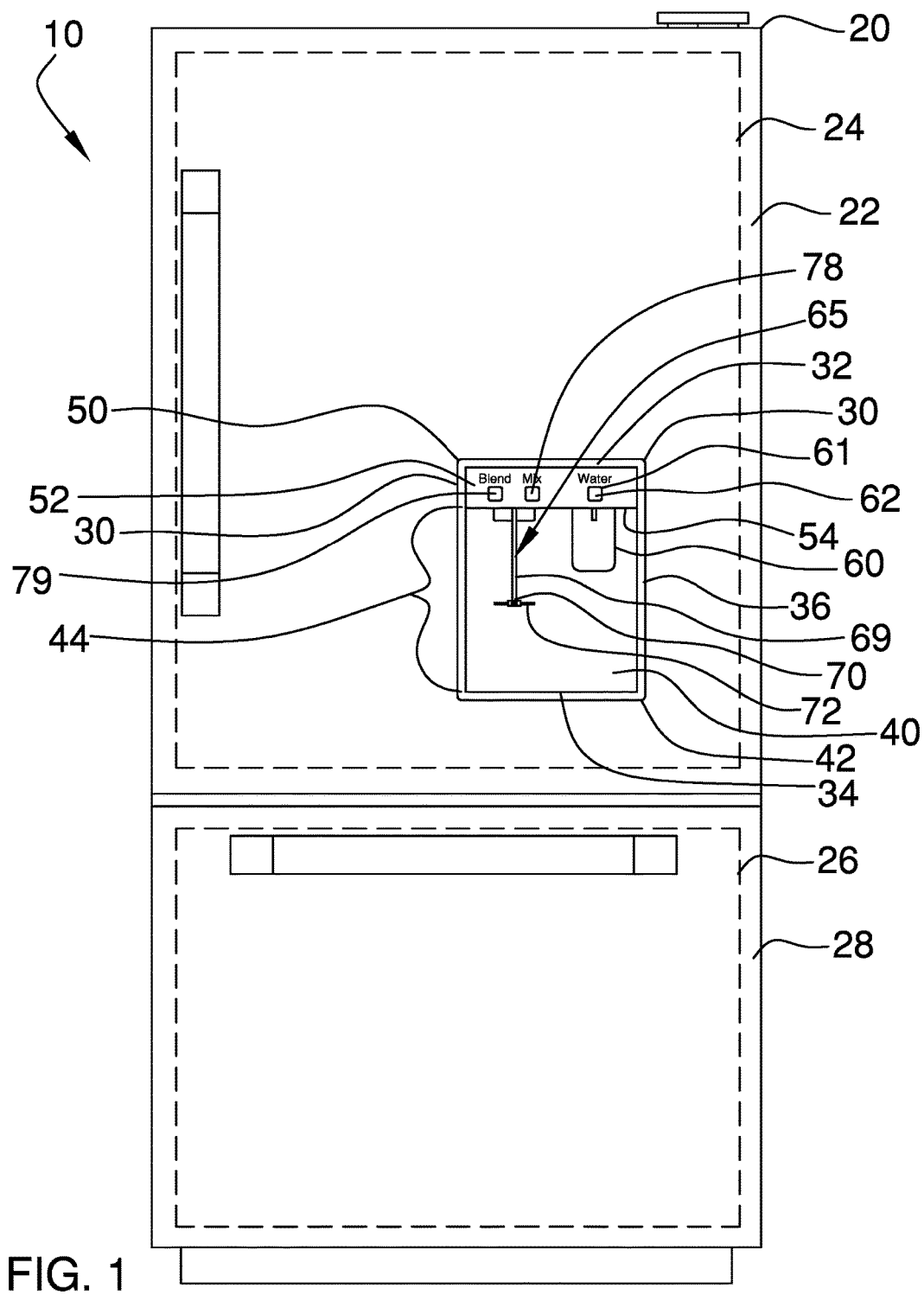
FIG. 1 is a front elevation view.
Figure 2:
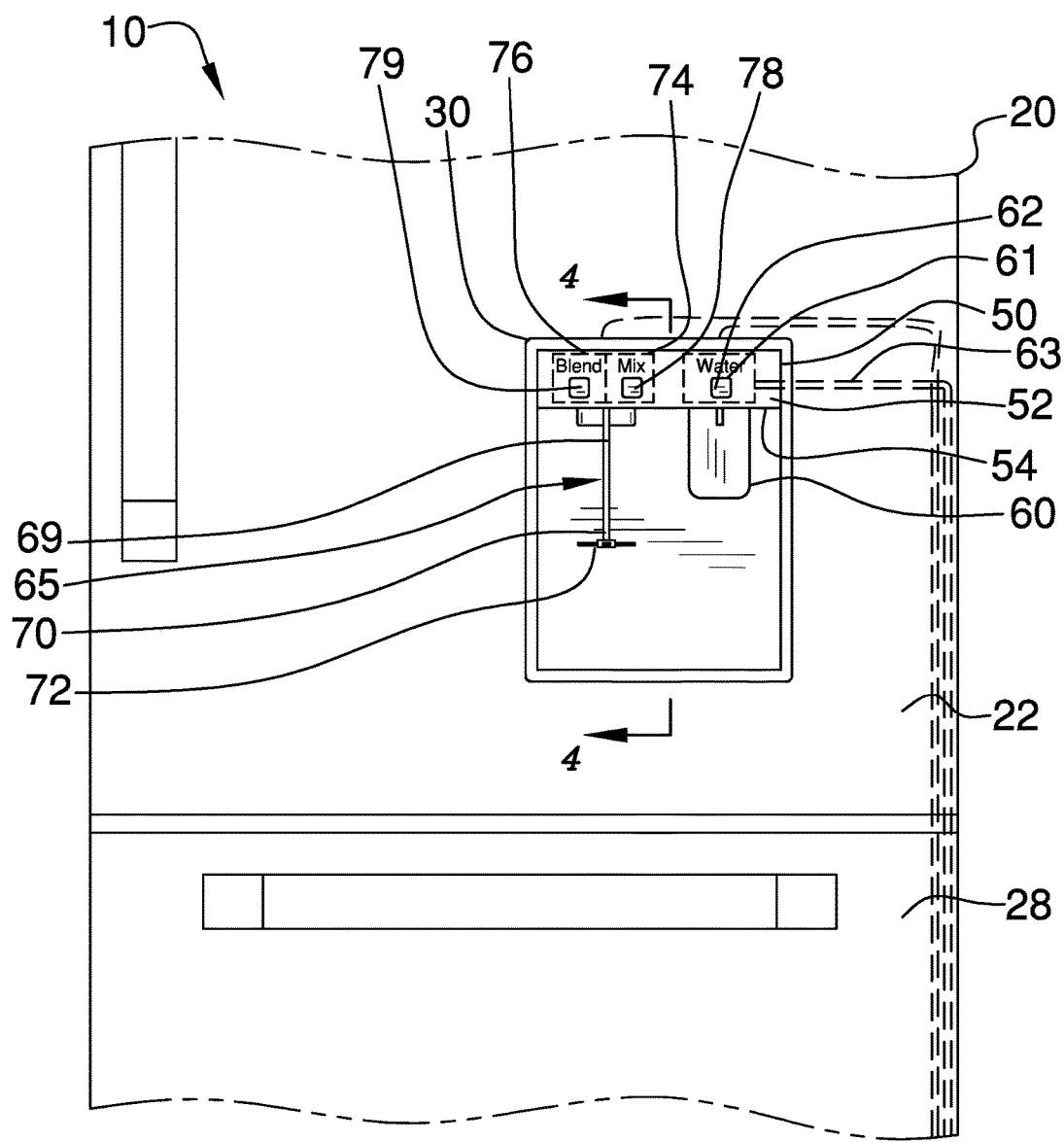
FIG. 2 is a detailed front elevation view.
Figure 3:
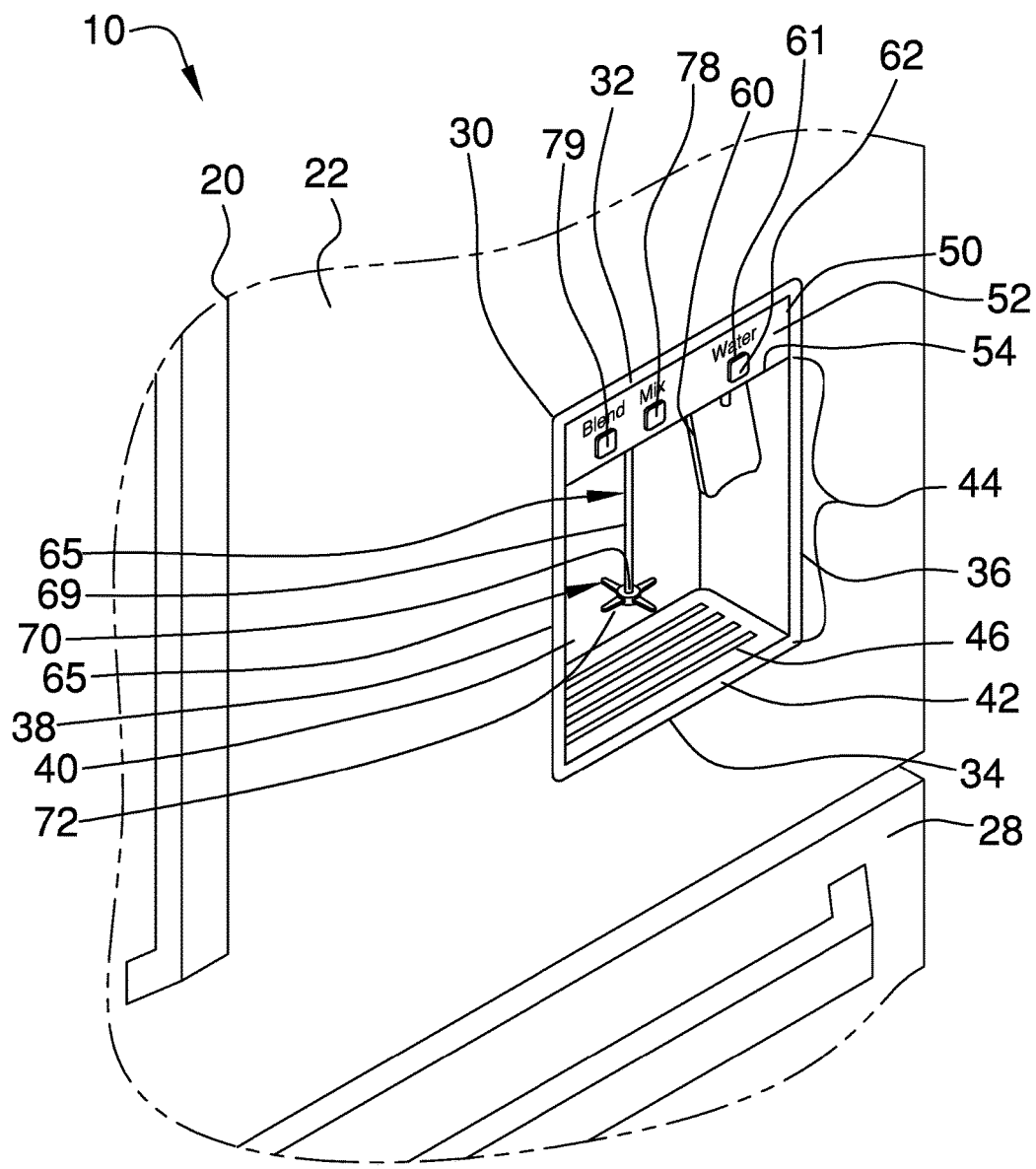
FIG. 3 is a detailed isometric view.
Figure 4:
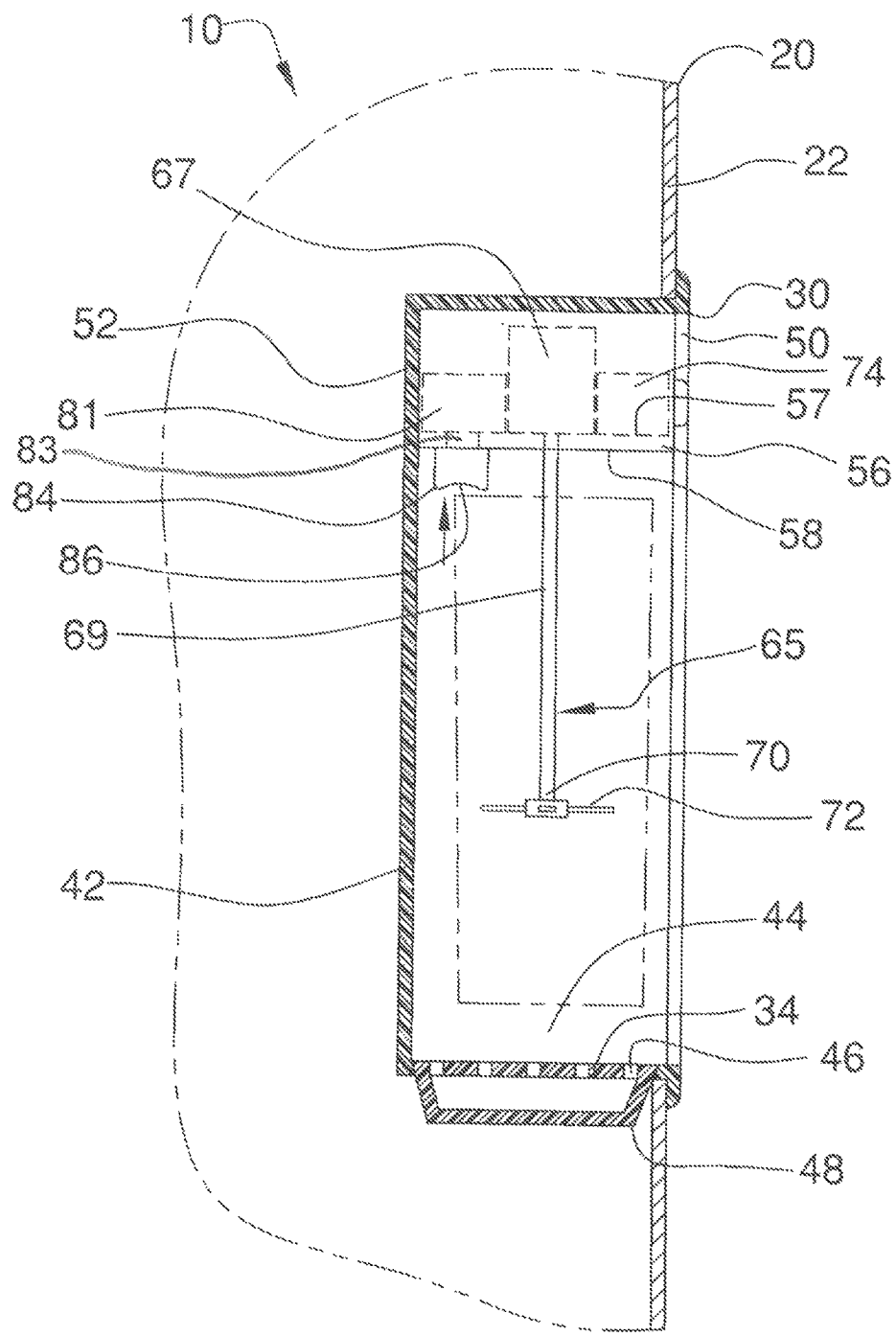
FIG. 4 is a cross-sectional view taken along line 4-4 of FIG. 2.

With reference now to the drawings, and in particular FIGS. 1 through 4 thereof, an example of the instant refrigerator with an integrated multi-speed blender employing the principles and concepts of the present refrigerator with an integrated multi-speed blender and generally designated by the reference number 10 will be described.

Referring to FIGS. 1 through 4 the present refrigerator with an integrated multi-speed blender 10 provided for the preparation of blended foods and drinks is illustrated. The refrigerator with an integrated multi-speed blender 10 includes a stand alone kitchen refrigerator 20. The kitchen refrigerator 20 has a front door 22, a fresh food compartment 24 accessed by the front door 22, and a freezer compartment 26 separate from the fresh food compartment 24. The freezer compartment 26 has an access door 28. A recess 30 is disposed in the front door 22. The recess 30 has an upper side 32, a lower side 34, a right side 36, a left side 38, a back side 40, a front frame 42, and an opening 44. A plurality of apertures 46 is disposed in the lower side 34 of the recess 30. A liquid collection pan 48 is disposed directly underneath the lower side 34 of the recess 30. The opening 44 is disposed between the upper side 32, the lower side 34, the right side 36, the left side 38, the back side 40 and the front frame 42.

A housing body 50 is continuously disposed on the upper side 32 of the recess 30 from the right side 36 to the left side 38. The housing body 50 has a forward side 52 and a bottom end 54. A support bracket 56 extends from the back side 40 of the recess 30 to the forward side 52 of the housing body 50 in a position parallel to the upper side 32 of the recess 30 along the bottom end 54 of the housing body 50. The support bracket 56 has a top surface 57 and a bottom surface 58. A water dispenser 60 is mounted on the back side 40 of the recess 30. The water dispenser 60 includes a user interface 61 with at least one control button 62 and a fluid supply line 63 extending from the water dispenser 60 to a source of water. The at least one control button 62 is configured to enable a user to select a preferred dispensing operation.

A blender assembly 65 is disposed within the recess 30 adjacent the water dispenser 60. The blender assembly 65 includes a motor 67 disposed atop the support bracket 56. A mixer shaft 69 is in operational communication with the motor 67 and extends through the support bracket 56 into the opening 44 of the recess 30. The mixer shaft 69 has a distal end 70. The distal end 70 of the mixer shaft 69 is disposed approximately midway between the bottom end 54 of the housing body 50 and the lower side 34 of the recess 30. A plurality of spaced apart blades 72 is disposed on the distal end 70 in a position substantially perpendicular to the mixer shaft 69. The opening 44 of the recess 30 has a depth, a width, and a length configured to receive a liquid container therein when a portion of the mixer shaft 69 and the plurality of blades 72 are disposed within the liquid container.

The blender assembly 65 also includes a first control switch 74 and a second control switch 76 disposed on the top surface 57 of the support bracket 56 proximal the motor 67. Each of the first and second control switches 74, 76 is in direct operational communication with the motor 67. A first pressure control button 78 and a second pressure control button 79 are disposed on the forward side of the housing body. Each of the first pressure control button 78 and the second pressure control button 79 is in direct operational communication with the first control switch 74 and the second control switch 76, respectively. The first pressure control button 78 activates the first control switch 74 and the second pressure control button 79 alternately activates the second control switch 76.

An activation switch 81 is disposed on the support bracket 56 proximal the motor 67. The activation switch 81 is in direct operational communication with the motor 67. The activation switch 81 activates and alternately deactivates the motor 67. An activation button 83 is disposed on the bottom surface 58 of the support bracket 56 and extends into the opening 44 of the recess 30. The activation button 83 has a lower surface 84. The activation button 83 is in direct operational communication with the activation switch 81. A concave indentation 86 is centrally disposed on the lower surface 84 of the activation button 83. The activation button 83 is movable between an initial lower position to a second upper position. The concave indention 86 enhances contact with the activation button 83 to maintain the activation button 83 in the second upper position.

Upon movement of the activation button 83 from the initial lower position to the second upper position, the activation switch 81 is transformed from a deactivated condition to an activated condition. Upon transformation of the activation switch 81 to the activated condition, the activation switch 81 activates the motor 67. Upon activation of the activation switch 81 activation of the first pressure control button 78, and the activation of the first control switch 74, the motor 67 operates at a first speed. Upon activation of the activation switch 81 and activation of the second pressure control button 79, the motor 67 operates at a second speed. The second speed is faster than the first speed.

The kitchen refrigerator 20 is shown in a bottom mount freezer configuration in the Figures; however, the kitchen refrigerator may take on other configurations as well, such as a side-by-side configuration.

What is claimed is:

1. A refrigerator with an integrated multi-speed blender comprising:

a stand alone kitchen refrigerator having a front door, a fresh food compartment accessed by the front door, and a freezer compartment separate from the fresh food compartment, the freezer compartment having an access door;

a recess disposed in the front door, the recessing having an upper side, a lower side, a right side, a left side, a back side, a front frame, an opening, a plurality of apertures disposed in the lower side of the recess, and a liquid collection pan disposed directly underneath the lower side of the recess, the opening disposed between the upper side, the lower side, the right side, the left side, the back side; and the front frame;

a housing body continuously disposed on the upper side of the recess from the right side to the left side, the housing body having a forward side and a bottom end;

a support bracket extending from the back side of the recess to the forward side of the housing body in a position parallel to the upper side of the recess, along the bottom end of the housing body, the support bracket having a top surface and a bottom surface;

a water dispenser mounted on the back side of the recess, the water dispenser including a user interface with at least one control button and a fluid supply line extending from the water dispenser to a source of water, wherein the at least one control button is configured to enable a user to select a preferred dispensing operation;

a blender assembly disposed within the recess adjacent the water dispenser, the blender assembly comprising:
 a motor disposed atop the support bracket;
 a mixer shaft in operational communication with the motor and extending through the support bracket into the opening of the recess, the mixer shaft having a distal end;
 a plurality of spaced apart blades disposed on the distal end in a position substantially perpendicular to the mixer shaft;
 a first control switch and a second control switch disposed on the top surface of the support bracket proximal the motor, each of the first and second control switches being in direct operational communication with the motor;
 a first pressure control button and a second pressure control button disposed on the forward side of the housing body, each of the first pressure control button and the second pressure control button being in direct operational communication with the first control switch and the second control switch, respectively, wherein the first pressure control button activates the first control switch and the second pressure control button alternately activates the second control switch;
 an activation switch disposed on the support bracket proximal the motor, the activation switch in direct operational communication with the motor, wherein the activation switch activates and alternately deactivates the motor; and an activation button disposed on the bottom surface of the support bracket and extending into the opening of the recess, the activation button having a lower surface, the activation button being in direct operational communication with the activation switch, wherein the activation button is movable between an initial lower position to a second upper position, wherein upon movement of the activation button from the initial lower position to the second upper position, the activation switch is transformed from a deactivated condition to an activated condition;

wherein upon transformation of the activation switch to the activated condition, the activation switch activates the motor;

wherein upon activation of the activation switch activation of the first pressure control button, and the activation of the first control switch, the motor operates at a first speed; and wherein upon activation of the activation switch and activation of the second pressure control button, the motor operates at a second speed, wherein the second speed is faster than the first speed.

2. The refrigerator with an integrated multi-speed blender of claim 1 comprising:

a concave indentation centrally disposed on the lower surface of the activation button.

3. The refrigerator with an integrated multi-speed blender of claim 1 wherein the distal end of the mixer shaft is disposed approximately midway between the bottom end of the housing body and the lower side of the recess.

4. The refrigerator with an integrated multi-speed blender of claim 3 wherein the opening of the recess has a depth, a width, and a length configured to receive a liquid container therein when a portion of the mixer shaft and the plurality of blades are disposed within the liquid container.

* * * * *